FULL BINARY ADDER INCLUDING NEGATIVE RESISTANCE DIODE

Filed Oct. 10, 1960

| | OUTPUTS | |
|---|---|---|
| INPUTS | SUM | CARRY |
| 0 | 0 | 0 |
| 1 | 1 | 0 |
| 2 | 0 | 1 |
| 3 | 1 | 1 |

INVENTORS
BENJAMIN RABINOVICI &
BY CHARLES A. RENTON
John V. Regan
ATTORNEY 3,125,674
FULL BINARY ADDER INCLUDING NEGATIVE RESISTANCE DIODE Benjamin Rabinovici, Rego Park, and Charles A. Renton, New York, N.Y., assignors to Radio Corporation of America, a corporation of Delaware
Filed Oct. 10, 1960, Ser. No. 61,550
9 Claims. (Cl. 235—172)

This invention relates to adders which employ the advantageous characteristic of negative resistance diodes.

It is an object of this invention to provide an adder which is reliable in operation, has low power dissipation and which can operate at high speeds.

It is another object of this invention to provide a full binary adder which is simple and inexpensive.

The circuit of the invention comprises an impedance bridge one arm of which includes a negative resistance diode, such as a tunnel diode. Signals indicative of input addend, augend and carry quantities are applied to one pair of the bridge terminals. An output signal indicative of a carry output quantity is obtained from another pair of bridge terminals. A second output signal, this one indicative of a sum output quantity, is obtained from a third pair of bridge terminals.

Figure 1:
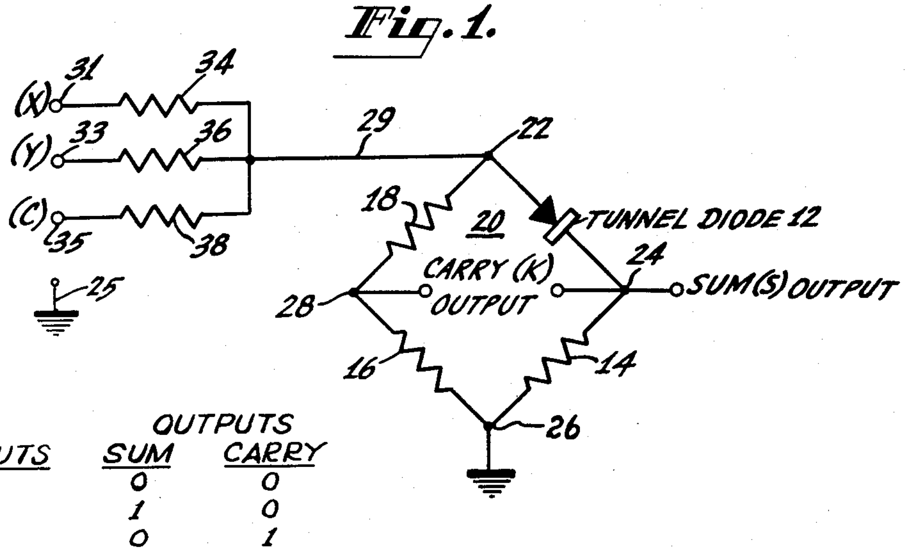
Figure 2:
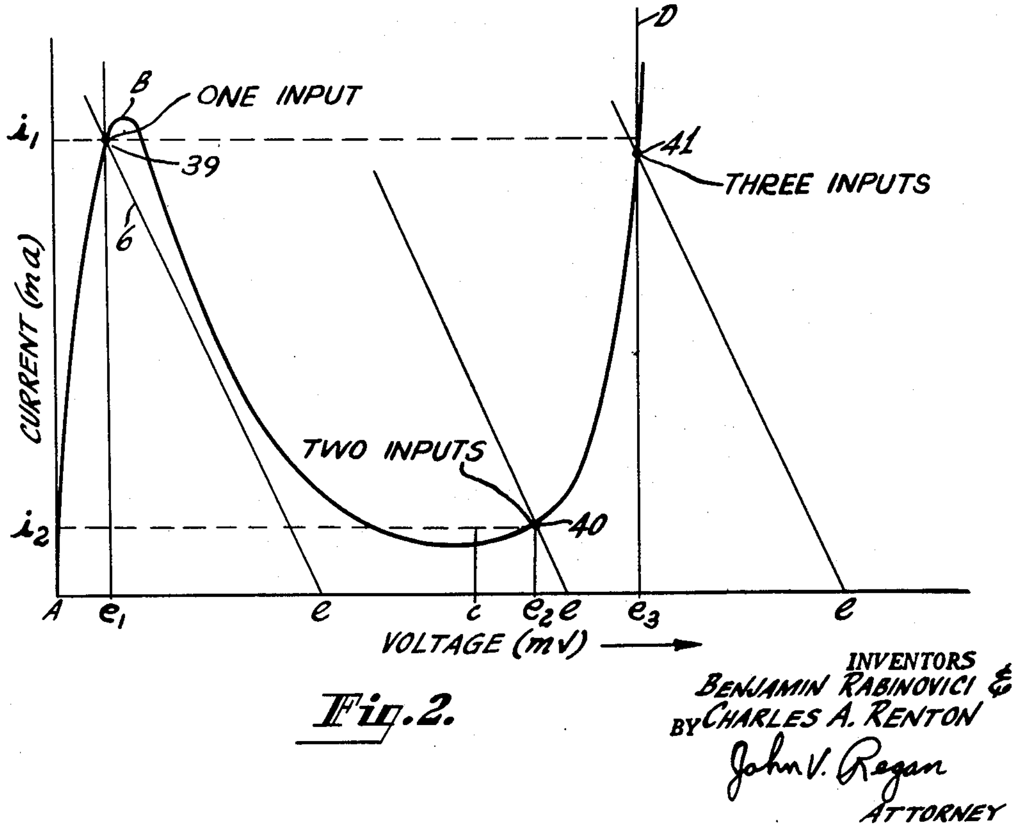

The invention will be described in greater detail by reference to the following description when taken in connection with the accompanying drawing, in which:

FIGURE 1 is a schematic circuit diagram of a binary adder according to the present invention, and FIGURE 2 is a characteristic curve of current-versus-voltage to explain the operation of the circuit of FIG. 1.

The brief review which follows of characteristics of negative resistance diodes may help the reader better understand the invention.

FIGURE 2 should be referred to first. The curve illustrated in FIG. 2 is a characteristic curve of current-versus-voltage for a negative resistance diode, known as "a tunnel diode." Such diodes and uses for them are described by Sommers, in the Proceedings of the I.R.E., July 1959, page 1201. A tunnel diode is a two terminal device whose voltage-ampere characteristics can be divided into three regions. Region 1 begins at point A, as illustrated in FIG. 2, and ends at point B which is a current "peak" at a low value of voltage, relatively speaking. In this region, the characteristic curve has a positive slope. Region 2 is the negative portion of the curve, and extends from the current "peak" B to the current "valley" C. Region 3 begins at the current "valley" C and extends toward the higher forward biased area D where normal forward bias diode characteristics prevail.

In the operation of a circuit containing a tunnel diode, the impedances associated with the diode and the current or voltages applied to the circuit determine the circuit's operating points. In the circuit of the present invention, the resistances associated with the diode provide a load line such as shown at 6 in FIG. 2 and having the slope indicated. The number of simultaneous pulses applied to the input terminals of the circuit determine the position of the load line and thereby determine the point of intersection between the load line and the characteristic curve of the diode. This intersection is the diode's operating point and indicates the current passing through the diode and the voltage across the diode.

The circuit of the present invention is shown in FIG. 1 and includes a tunnel diode 12 and three resistors 14, 16 and 18 connected in a bridge circuit 20. Preferably, resistors 14 and 16 are of the same value and the resistance of resistor 18 is equal to the static resistance of the tunnel diode 12 at operating point 1 (FIG. 2). The latter operating point is the intersection of the load line and diode characteristic curve when one input pulse is present. The input terminals of the bridge circuit are the diagonal terminals 22 and 26. One pair of output terminals are the other diagonal terminals 24 and 28. Terminal 26 is connected to a point of reference potential, shown as ground in the drawing.

The input signals to the circuit of FIG. 1 are voltages indicative of the addend X, augend Y and carry C quantities. These are applied from terminals 31, 33, 35 respectively through resistors 34, 36 and 38, to terminal 22. The resistors (shown connected between terminals 22 and the input terminals X, Y and C) may be lumped elements or may represent the internal resistances of the circuits (not shown) supplying the input voltages to the adder. It may be assumed that these resistors are connected through these input circuits to ground. Terminal 25, which is common to terminals 31, 33 and 35, is also connected to ground.

A carry (K) output voltage of the circuit is available between terminals 24 and 28 of the bridge circuit 20. A sum (S) output voltage of the circuit is available between terminals 24 and 26, the latter terminal being grounded.

The input and output signals of the circuit of FIG. 1 represent binary quantities. An input voltage which is positive and is greater than a given value but less than another given value represents the binary digit "one"; an input voltage of zero or of less than a given value represents the binary digit "zero"; an output voltage which is positive and greater than a given value represents the binary digit "one"; an output voltage of zero or of less than a given value represents the binary digit "zero." Specific values are given later.

A truth table for a full adder having three inputs X, Y and C is as follows:

| Inputs | | | Outputs | |
|---|---|---|---|---|
| X | Y | C | Sum (S) | Carry (K) |
| 0 | 0 | 0 | 0 | 0 |
| 1 | 0 | 0 | 1 | 0 |
| 0 | 1 | 0 | 1 | 0 |
| 0 | 0 | 1 | 1 | 0 |
| 1 | 1 | 0 | 0 | 1 |
| 1 | 0 | 1 | 0 | 1 |
| 0 | 1 | 1 | 0 | 1 |
| 1 | 1 | 1 | 1 | 1 |

The circuit of FIG. 1 implements the truth table as follows: Assume, first, that the input quantities X, Y and C are all binary "zero." In this case, there is no current flow between terminals 22 and 26. Thus, the voltage between terminals 24 and 28 and terminals 24 and 26 is zero representing binary "zero," so that $K=0$ and $S=0$.

Assume, now, that one of the three inputs represents the binary digit "one" and the other two a binary digit "zero." The input configuration is such that it does not matter which one of the inputs represents the binary "one." The presence of one input voltage across the input terminals 22 and 26 causes a current $i_1$, as represented by the operating point 39 in FIG. 2, to flow through the diode 12. At this value of current, the resistance of the diode 12 is equal to the resistance of the resistor 18. Since the resistance of the resistor 14 is also equal to that of resistor 16, the same current $i_1$ flows through resistors 18 and 16 as through the tunnel diode and resistor 14, the bridge is balanced, and the voltage at terminal 24 is equal to the voltage at terminal 28. The carry output is therefore zero volts representing the binary digit "zero." However, the current flow $i_1$ through resistor 14 causes a substantial voltage drop between the sum output terminals 24, 26 representing the binary digit "one."

Assume now that two of the three inputs represent a binary "one" and the other input a binary "zero." The input voltage applied across the terminals 22 and 26 causes the diode 12 to switch to the low current region of its high voltage state (operating point 40 in FIG. 2). At this operating point, the diode exhibits a relatively high resistance and the current through the diode decreases substantially to a value $i_2$. The total current available at terminal 22 is substantially greater than $2i_1$ and, in view of the increased resistance of the diode, the major portion of this current now steers into the branch of the bridge which includes resistors 18 and 16. Accordingly, the voltage developed across resistor 16 is substantially greater than that developed across resistor 14, and the difference in these voltages (the carry K output) represents the binary digit "one." At the same time, the voltage drop between terminals 24 and 26 is very small due to the small current flow $i_2$ through the tunnel diode 12 and resistor 14, so that the sum output represents a binary "zero."

Assume now that all three inputs represents a binary "one." The voltage $e_3$ (FIG. 2) applied between terminals 22 and 26 causes the diode to switch to operating point 41. At operating point 41, the static resistance of the diode is much greater than its resistance at operating point 39. Since the resistance of resistor 18 is equal to that of the diode at operating point 1 the static resistance of the diode at operating point 41 is much greater than that of the resistor 18. Accordingly, the bridge is unbalanced in that the resistance of branch 18, 16 is much less than that of branch 12, 14, and the major portion of the current available at terminal 22 steers into branch 18, 16. Since the current through resistor 16 is much greater than that through resistor 14, a substantial difference in voltage appears between carry K output terminals 28, 24 representative of the binary digit "one." The current $i_1$ which flows through resistor 14 also develops a substantial voltage between sum S and output terminals 24, 26 representative of the binary digit "one."

From the above, it is evident that the bridge circuit described performs full binary addition. This bridge circuit can be operated as applying a continuous voltage indicative of a binary "zero" to one of the inputs, for example, $C=0$.

A circuit according to the present invention may have thet following circuit parameters. These values are illustrative and are not to be taken as limiting:

| | |
|---|---|
| Resistors **14** and **16** | 120 ohms each. |
| Resistor **18** | 39 ohms. |
| Tunnel diode **12** | Type G.E.–1N2939, 1.25 ma. peak current. |

The following table gives the output voltage for the application of a different number of inputs:

| Number of Inputs | 1 | 2 | 3 |
|---|---|---|---|
| Sum (S) mv. | 130 | 10 | 130 |
| Carry (K) mv. | 0 | 300 | 310 |

An output voltage between 0 and 15 mv. represents a binary "zero" and an output voltage between 130 mv. and 310 mv. represents a binary "one." These outputs may be standardized by using suitable threshold circuits.

In the circuit described, the carry K output floats. This output may be referenced to ground in a number of ways. As one example, with pulse type inputs, transformer coupling at the carry output may be employed.

We claim:

1. An adder comprising a bridge circuit having four arms connected between four terminals, one of said arms comprising a negative resistance diode, the other three said arms comprising resistive elements, means for applying input signals across two opposite ones of said terminals, and means for obtaining a sum output and a carry output from three of said terminals.

2. An adder comprising a bridge circuit having four arms, one of said arms comprising a tunnel diode, the others of said arms comprising resistive elements, the static resistance of said diode being equal to the resistance of one of said arms, means for applying input signals to said bridge circuit, and means for obtaining a sum output and a carry output from said circuit.

3. An adder comprising a bridge circuit having two pairs of diagonal terminals and having four arms, one of said arms comprising a negative resistance diode, the others of said arms comprising resistive elements, means for applying input signals across one of said pairs of diagonal terminals of said bridge circuit to switch said negative resistance diode to different stable states, and means for obtaining combinations of sum outputs and carry outputs when said negative resistance diode is in said different stable states.

4. An adder comprising a bridge circuit having four terminals and four arms, one of said arms comprising a negative resistance diode, the other three of said arms comprising resistive elements, means for applying addend, augend, and carry signals to one of said terminals, and means for obtaining a sum output and a carry output from the other three of said four terminals.

5. A bridge circuit having four arms, one of said arms comprising a negative resistance diode, the others of said arms comprising resistive elements, three input means connected to said bridge circuit, first means for receiving an output signal only when a signal is applied to an odd number of said input means, and second means for receiving an output only when a signal is applied to two or three of said input means.

5. An adder comprising a bridge circuit having four arms, one of said arms comprising a tunnel diode, the others of said arms comprising resistive elements, means for applying input signals between one set of opposite terminals of said bridge circuit, means connected across one of said resistive elements for receiving sum output signals, and means connected between the other set of opposite terminals of said bridge circuit for receiving carry output signals.

7. An adder comprising a bridge circuit having first and second branches each including two arms, said first branch having one arm comprising a tunnel diode and the other arm comprising a resistive element, said second branch having two arms comprising resistive elements, the static resistance of said diode being equal to the resistance of the corresponding arm in said second branch of said bridge, three input means connected between one set of opposite terminals of said bridge circuit, means connected across said resistive element of said first branch for receiving sum output signals, and means connected between the other set of opposite terminals of said bridge circuit for receiving carry output signals.

8. An adder comprising a pair of input terminals, a first circuit comprising two resistors in series connected between said terminals, a second circuit comprising a resistor in series with a negative resistance diode, said second circuit being connected in parallel with said first circuit between said pair of input terminals, means for applying input pulses to said input terminals in a forward direction with respect to said diode, a first pair of output terminals, one of said output terminals being connected to said first circuit between said resistors, the other of said output terminals being connected to said second circuit between said diode and said resistor, and a second pair of output terminals connected to said second circuit across said resistor.

9. An adder comprising a pair of input terminals, a first circuit comprising a first and second resistor connected in series, a second circuit comprising a third resistor in series with a tunnel diode, said second circuit being connected in parallel with said first circuit between said pair of input terminals, the resistances of said second and third resistors being equal, the resistance of said first resistor being equal to the static resistance of said tunnel diode, means for applying input pulses to across said input terminals in a forward direction with respect to said diode, a first pair of output terminals, one of said output terminals being connected to said first circuit between said resistors, the other of said output terminals being connected to said second circuit between said diode and said resistor, and a second pair of output terminals connected to said second circuit across said third resistor.

References Cited in the file of this patent

UNITED STATES PATENTS 3,065,636 Pfann ---------------- Nov. 10, 1962

OTHER REFERENCES

Horton & Anderson, "A Full Binary Adder . . . ," IBM Journal, July 1958, pp. 223 to 231 (page 223 relied on).